(12) United States Patent
Cheng et al.

(10) Patent No.: US 12,161,141 B2
(45) Date of Patent: Dec. 10, 2024

(54) EXTREME VACUUM COOLING WITH ADAPTIVE CHAMBER PRESSURE CONTROL FOR FOOD FLAVOR INFUSION

(71) Applicant: Culinary Sciences, Inc., Campbell, CA (US)

(72) Inventors: George Shu-Xing Cheng, Folsom, CA (US); Gregory P. Fatigati, Mountain View, CA (US)

(73) Assignee: Culinary Sciences, Inc., Campbell, CA (US)

( * ) Notice: Subject to any disclaimer, the term of this patent is extended or adjusted under 35 U.S.C. 154(b) by 0 days.

(21) Appl. No.: 17/710,677

(22) Filed: Mar. 31, 2022

(65) Prior Publication Data

US 2023/0309584 A1 Oct. 5, 2023

(51) Int. Cl.
*A23L 3/00* (2006.01)
*A23B 4/02* (2006.01)
(Continued)

(52) U.S. Cl.
CPC ................ *A23L 3/001* (2013.01); *A23B 4/02* (2013.01); *A23B 4/06* (2013.01); *A23B 4/26* (2013.01);
(Continued)

(58) Field of Classification Search
CPC .......... A23L 3/001; A23L 13/72; A23L 19/00; A23B 4/02
(Continued)

(56) References Cited

U.S. PATENT DOCUMENTS

| 6,090,422 A | 7/2000 | Taragan et al. |
| 10,100,821 B2 | 10/2018 | Yatsu |

(Continued)

FOREIGN PATENT DOCUMENTS

| CH | 708608 A2 | 3/2015 |
| CN | 104172222 A | 12/2014 |

(Continued)

OTHER PUBLICATIONS

Machine Translation of CN208192075U (Year: 2023).*
(Continued)

*Primary Examiner* — Nathaniel E Wiehe
*Assistant Examiner* — Thomas J Ward
(74) *Attorney, Agent, or Firm* — Stout, Uxa & Buyan, LLP; Donald E. Stout

(57) ABSTRACT

A method and apparatus is disclosed relating to food processing and preparation in commercial kitchens. The inventive extreme vacuum cooling (EVC) technology and apparatus for food rapid cooling and food flavor infusion can work in ultra low pressure conditions with adaptive chamber pressure control to avoid liquid splash inside the food chamber. The disclosed EVC cooling and food flavor infusion apparatus has a one-unit design for handing small payloads, and a dual-module design to handle larger payloads. It can accelerate the food marinating and brining process with substantial time savings. Using the EVC apparatus, large amounts of meats, vegetables, and fruits can be prepared with various flavor infusion recipes. Plant-forward and high-volume food service kitchens can become more time and energy efficient, less labor intensive, and higher throughput food preparation operations.

15 Claims, 11 Drawing Sheets

(51) Int. Cl.
    A23B 4/06      (2006.01)
    A23B 4/26      (2006.01)
    A23B 7/04      (2006.01)
    A23B 7/153     (2006.01)
    A23B 7/158     (2006.01)
    A23L 3/36      (2006.01)
    A23L 13/72     (2023.01)
    A23L 19/00     (2016.01)
    B01D 8/00      (2006.01)

(52) U.S. Cl.
    CPC ............... *A23B 7/04* (2013.01); *A23B 7/153*
        (2013.01); *A23B 7/158* (2013.01); *A23L 3/36*
        (2013.01); *A23L 13/72* (2016.08); *A23L 19/00*
                    (2016.08); *B01D 8/00* (2013.01)

(58) Field of Classification Search
    USPC .......................................................... 99/472
    See application file for complete search history.

(56) References Cited

U.S. PATENT DOCUMENTS

| | | | | |
|---|---|---|---|---|
| 10,667,436 | B2* | 5/2020 | LeFebvre | H05K 7/20827 |
| 2005/0004687 | A1 | 1/2005 | Shu-Xing | |
| 2009/0165478 | A1* | 7/2009 | Devos | F25D 29/00 |
| | | | | 62/132 |
| 2010/0243800 | A1* | 9/2010 | Koschberg | B64D 11/04 |
| | | | | 244/118.5 |
| 2016/0348962 | A1 | 12/2016 | Roekens et al. | |
| 2021/0127717 | A1 | 5/2021 | Katsumata et al. | |

FOREIGN PATENT DOCUMENTS

| | | | | |
|---|---|---|---|---|
| CN | 107192201 | A | 9/2017 | |
| CN | 208192075 | U * | 12/2018 | ............... A23L 3/36 |
| CN | 111829262 | A | 10/2020 | |
| CN | 113966854 | A | 1/2022 | |
| EP | 0393777 | A2 | 10/1990 | |
| EP | 3473952 | A1 | 4/2019 | |
| IT | 3473952 | * | 4/2019 | ........... A23L 3/3418 |
| JP | 2018-162960 | A | 10/2018 | |
| KR | 10-2008-0094889 | A | 10/2008 | |
| WO | 2007-094141 | A1 | 8/2007 | |
| WO | 2010-094122 | A1 | 8/2010 | |

OTHER PUBLICATIONS

Machine Translation of EP3473952 (Year: 2023).*
International Search Report and Written Opinion issued on Jul. 17, 2023 in connection with corresponding PCT App. No. PCT/US2023/016912.

* cited by examiner

EXTREME VACUUM COOLING WITH ADAPTIVE CHAMBER PRESSURE CONTROL FOR FOOD FLAVOR INFUSION

The subject of this patent relates to food processing and preparation for commercial kitchens and food processing plants. More particularly, this patent relates to a method and apparatus for food rapid cooling and flavor infusion.

In U.S. patent application Ser. No. 17/469,712, the entirety of which is hereby incorporated by reference, we disclosed a method and apparatus of Extreme Vacuum Cooling (EVC), where an EVC cooler can work at ultra low pressure conditions with adaptive pressure control for processing large amounts of food to meet government food safety regulations, save energy and time, and achieve uniform cooling to retain good food quality. The Extreme Vacuum Cooling (EVC) technology is defined as vacuum cooling at extremely low pressure conditions with vacuum chamber pressure control and added clean dry air or inert gas.

Vacuum cooling is based on the principle of evaporative cooling, where water will absorb a large amount of heat in order to evaporate from liquid to gas. Water evaporation can happen at any temperature above the freezing point. When the chamber pressure of the EVC apparatus is intentionally reduced, the vapor pressure of the water inside the food can become higher than the chamber pressure, resulting in rapid conversion of water inside the food into vapor. This water evaporation transfers the energy to cool the food uniformly throughout the entire food substance. The conversion of water into vapor can happen quickly so that the resulting energy transfer can cool the food uniformly and rapidly.

However, if the pressure difference between the chamber pressure and vapor pressure of the water inside the food is too high, excessive bubbling can occur due to rapid evaporation. When the bubbles burst at the food surface, the force of the bubble surface tension can cause a splash inside the chamber. This is not an issue for solid foods, like beef and chicken as the food structure will not come apart when vapor moves through the food into the vacuum chamber. For low viscosity foods, such as soups and sauces, this can be a big issue. We call this a liquid splash event for those low viscosity foods.

In U.S. patent application No. 17/469,712, solid foods with high viscosity were defined as Type A Foods, and liquid foods with low viscosity were defined as Type B Foods. For example, Type A Foods include beef, pork, chicken, potatoes, baked foods, and sautéed meats and vegetables. Type B Foods include soup, stews, sauces, and spaghetti in sauce. There can be gray areas for being actual Type A or B Foods. In any case, viscosity is used in food cooling recipes and chamber pressure setpoint calculations to ensure that the EVC apparatus can cool all type of foods with good and consistent performance.

Liquid splash events can contaminate the food chamber when the interior chamber surfaces and shelving fixtures are coated with food liquids and sauces. It is important to control the chamber pressure carefully for Type B Foods so that the pressure difference between the chamber pressure and vapor pressure is managed properly and automatically to enable rapid cooling and avoid liquid splash.

In recent years, the culinary industry has been promoting the concept of plant-forward. It is a type of cooking and eating that emphasizes foods from plant sources including fruits and vegetables, whole grains, legumes, nuts and seeds, plant oils, and herbs and spices for the benefit of our health and the sustainability of our planet. Although a small portion of meats can still be incorporated into a plant-forward dish, this new style of plant based dishes need more flavor to attract consumers.

In a commercial kitchen, chefs and workers need to prepare large amounts of food with certain time limitations. To give food more and better flavor, they often marinate and brine the meats and vegetables before cooking. However, marinating or brining foods using conventional methods can take many hours to days. This can become a main bottleneck for the commercial kitchen. Therefore, it is desirable to provide a food flavor infusion apparatus that can enable the chefs to prepare large amounts of food in a much shorter time.

Various attempts were made to accelerate the marinating process. For instance, there are vacuum marinators for home use such as those described in U.S. Pat. No. 7,047,875 with models ranging from simple sealed containers to those that use a hand pump to remove air. In addition, vacuum tumblers such as those described in U.S. Pat. No. 5,230,221 can be useful to improve the food marinating process.

Although these devices could potentially improve marinating to a certain degree, they have key weaknesses and are not suitable for food flavor infusion in commercial kitchens. The reasons include the following: (1) These devices can create a vacuum condition only slightly below ambient atmosphere pressure. Therefore, the time savings due to vacuum are very minimal. (2) These devices typically work at room temperature. If flavor infusion cannot be done within the 4-hour food safety regulation period, it can cause food safety issues. (3) Food vacuum tumblers can damage the food in its tumbling operation that can compromise product quality. (4) Home use marinators can process only small amount of food.

On the other hand, there are vacuum coolers used in agriculture and food processing such as those used for cooling bakery products. However, these vacuum cooling equipment cannot be used for food flavor infusion. They do not have the capability to deal with liquid splash problems. Since food flavor infusion requires soaking the foods in marinade or brine, the liquid splash problem is a main technical barrier for a vacuum cooling apparatus to be useful for food flavor infusion.

In this patent, we describe an extreme vacuum cooling (EVC) technology and apparatus for food flavor infusion. The EVC apparatus can work in ultra low pressure conditions such as at 1 kPa or 99% vacuum conditions to achieve much more time and energy efficient cooling and flavor infusion. Adaptive pressure control for the food chamber is implemented to avoid liquid splash so that the EVC apparatus can be effectively used for food rapid cooling and flavor infusion with substantial amount of time savings. Using the EVC food flavor infusion apparatus, large amounts of meats, vegetables, and fruits can be marinated or brined with various flavor infusion recipes.

Various brining and marinating tests for meats and vegetables were conducted to quantify the performance of the EVC food flavor infusion apparatus operating at 0.01 ATM compared with the same foodstuff in atmosphere pressure using traditional methods. The weight gain on the tested foodstuff is used to quantify the flavor infusion effectiveness. As a case example, for each test using the EVC apparatus after 4 hours of brining time, the weight gain for the tested meat is recorded. The same type and amount of meat is then brined in atmosphere pressure with the traditional method. After the weight gain reaches the same amount, the brining time is recorded. Our test results show that the time savings using the EVC apparatus for food flavor infusion are significant. Typically, the required brining or marinating time is 2 to 3 times shorter.

The term mechanism is used herein to represent hardware, software, or any combination thereof. The term EVC refers to Extreme Vacuum Cooling defined and described in this patent application. The term EVC cooling and food flavor infusion equipment refers to the extreme vacuum cooling apparatus introduced in this patent. The term HMI refers to Human-Machine-Interface that includes a computer screen to allow a user to interact with a device. The term IPC refers to Industrial Personal Computers. The term PLC refers to Programmable Logic Controllers. The term PAC refers to Programmable Automation Controllers.

In this patent, we define solid foods with high viscosity as Type A Foods, and liquid foods with low viscosity as Type B Foods. For example, Type A Foods include beef, pork, chicken, potatoes, baked foods, and sautéed meats and vegetables. Type B Foods includes marinade, brine, salt water, wine, juices, oil, soup, stews, sauces, and spaghetti in sauce.

Without losing generality, all numerical values given in this patent are examples. Other values can be used without departing from the spirit or scope of this invention. The description of specific embodiments herein is for demonstration purposes and in no way limits the scope of this disclosure to exclude other not specially described embodiments of this invention.

DESCRIPTION

A. Apparatus of Extreme Vacuum Cooling for Food Flavor Infusion

An extreme vacuum cooling (EVC) apparatus having two design embodiments with adaptive chamber pressure control for food rapid cooling and flavor infusion are illustrated in FIGS. 1 to 11.

Figure 1:
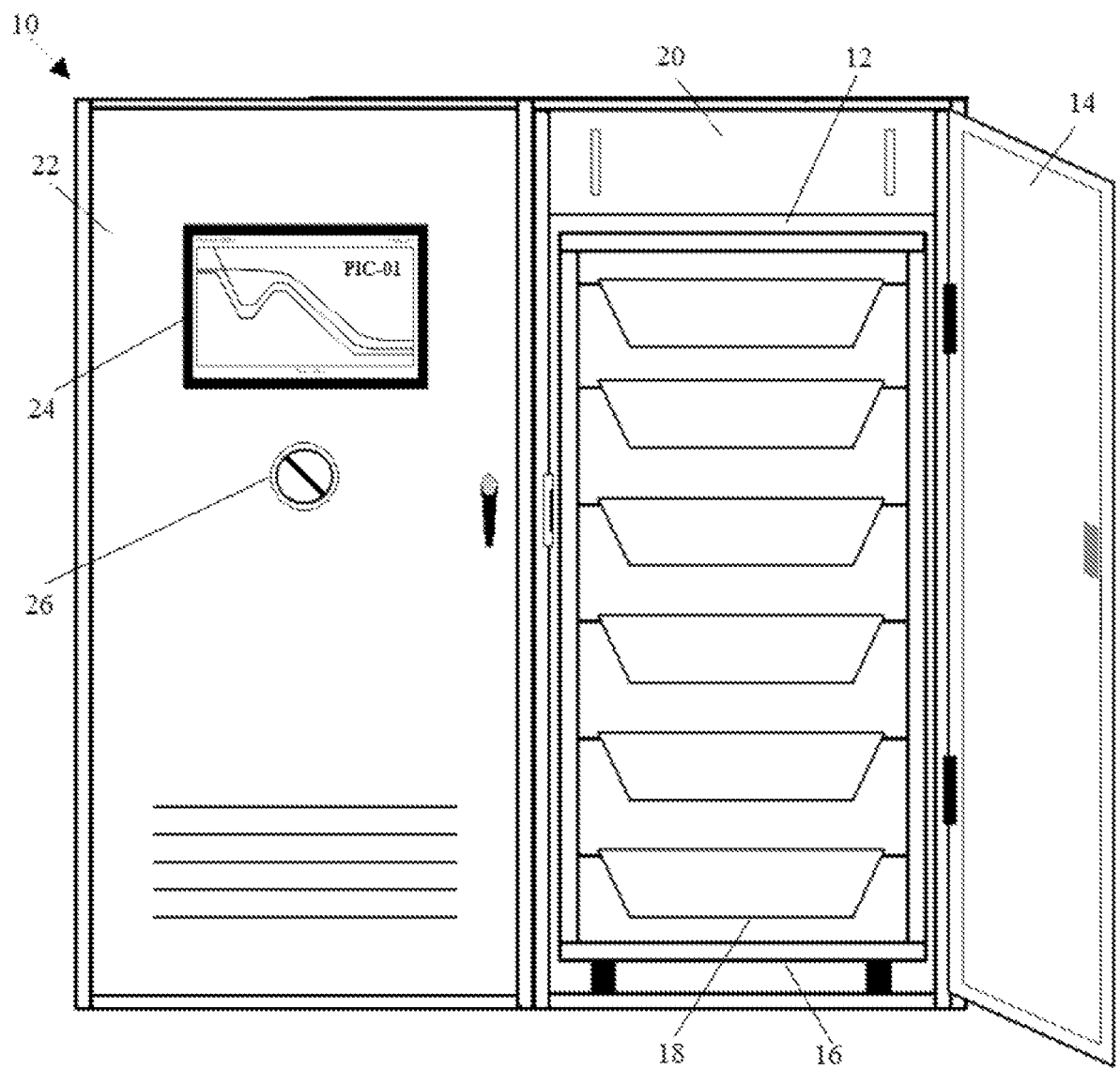
FIG. 1 is a perspective view of an EVC cooling and food flavor infusion apparatus with a single unit design, according to an embodiment of this invention.

FIG. 1 is a perspective view of an EVC cooling and food flavor infusion apparatus with a single unit design, according to an embodiment of this invention. The EVC cooling and food flavor infusion apparatus 10 comprises a food chamber 12, a chamber door 14, a trolley being rolled inside the food chamber 16, food pans on the trolley 18, an instrument panel 20, a left front panel 22, a control and monitoring computer with HMI screen 24, and a system power switch 26.

The food chamber 12 is built so that it can work in extremely low pressure conditions. In this embodiment, the extremely low pressure conditions can be defined as being less than or equal to about 0.1 ATM or 10 kPa. The chamber door 14 allows easy access to the food chamber and can seal the food chamber from the atmosphere pressure. Since the apparatus can operate at extremely low pressure conditions, the food chamber and its door are specially designed and built to deal with the pressure difference of the atmosphere pressure and 0 Pascal vacuum pressure, which is about 100 kPa. The food pan trolley 16 is built in stainless steel with multiple racks to hold food pans or trays. The foodstuffs such as meats, vegetables, noodles, and soup are put inside the food pans 18. The instrument panel 20 comprises sensors, an inflow air control valve and an air filter, electrical wires, and signal wires. The left front panel 22 covers the main components of the apparatus to be described in FIG. 2. The control and monitoring computer with HMI screen 24 is mounted on the left front panel and can provide chamber pressure control and logic control for the EVC apparatus. The human-machine-interface (HMI) screen allows the user to operate the apparatus. The system power switch 26 can turn the apparatus on and off.

In this embodiment, the EVC apparatus has a single unit design with all the components assembled as one piece of the equipment. It is a simpler design suitable for rapid cooling and food flavor infusion applications where the total payload is relatively small such as less than 100 pounds.

Figure 2:
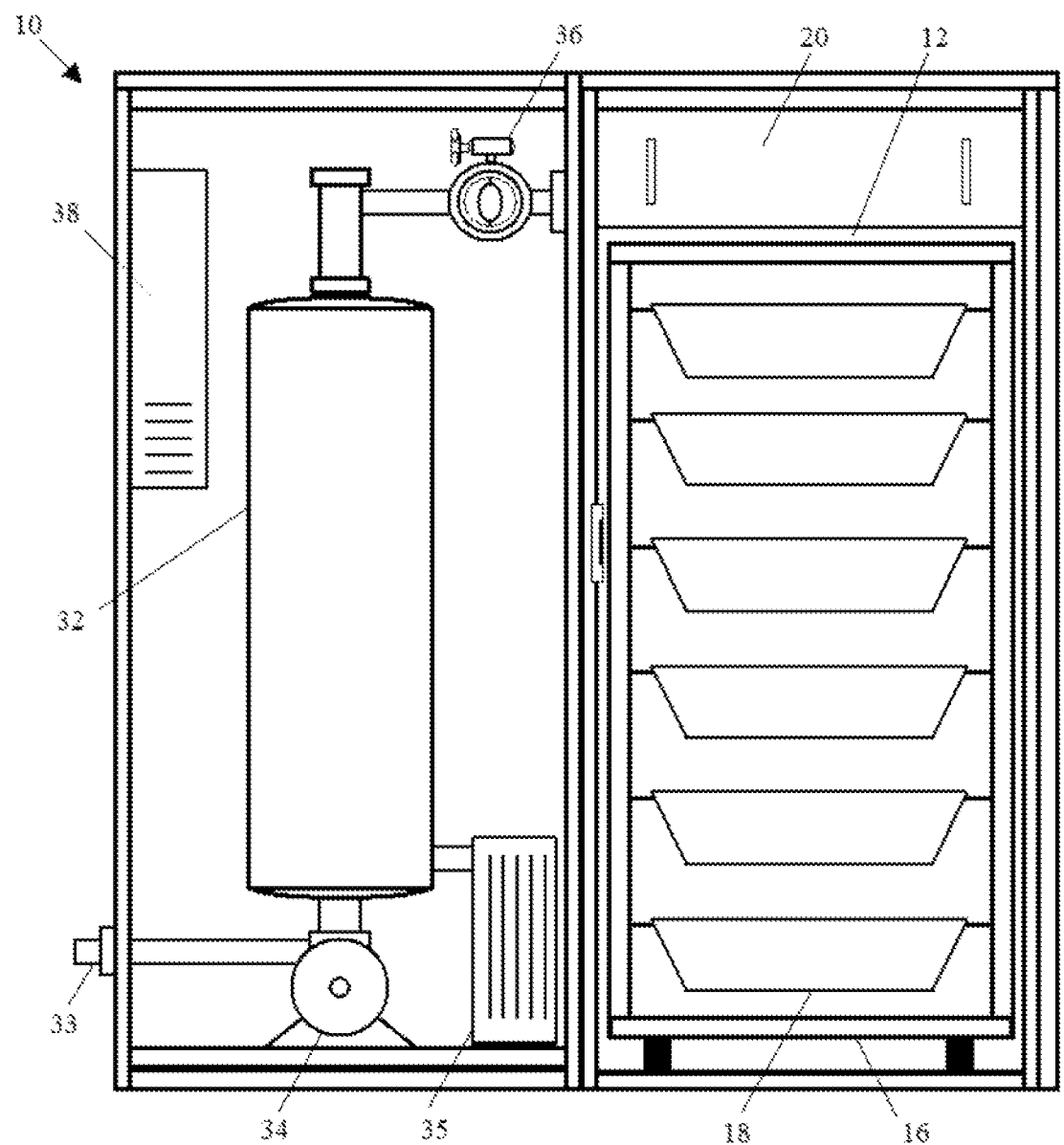
FIG. 2 is a perspective view of an EVC cooling and food flavor infusion apparatus with a single unit design showing more components, according to an embodiment of this invention.

FIG. 2 is a perspective view of an EVC cooling and food flavor infusion apparatus with a single unit design showing more components, according to an embodiment of this invention. The EVC cooling and food flavor infusion apparatus 10 comprises a food chamber 12, a trolley being rolled inside the food chamber 16, food pans on the trolley 18, an instrument panel 20, a cold trap 32, a vacuum pump 34, a vacuum control valve 36, an outflow air outlet 33, a refrigeration unit 35, and an electrical panel 38.

In FIG. 2, the components 12, 16, and 18 have been described in FIG. 1. The cold trap 32 is used to condense water vapor from the food chamber back to liquid form. The vacuum pump 34 can pump air out of the food chamber to reach extremely low pressure conditions. The vacuum control valve 36 is used to isolate the cold trap 32 and food chamber 12. This valve can also regulate the outflow air when the vacuum pump 34 is running to pump the air out of the food chamber. Therefore, it is used as one of the actuators to control the chamber pressure. The refrigeration unit 35 is used to cool down the cold trap 32 to condense water vapor. The outflow air outlet 33 allows the air to be pumped out to the atmosphere. The electrical panel 38 is used to receive electric power and supply the power to the EVC apparatus.

Figure 3:
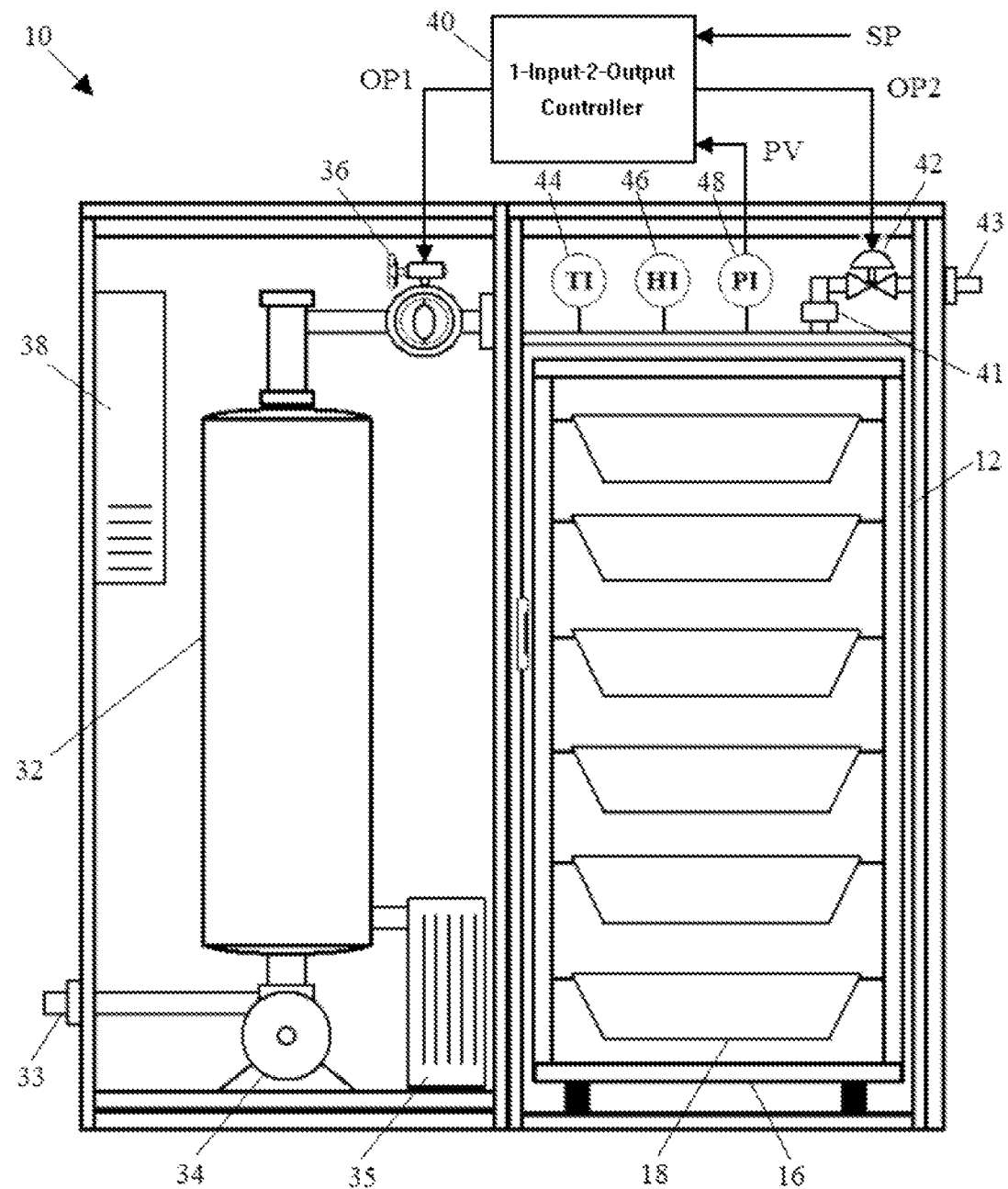
FIG. 3 is a perspective view of an EVC cooling and food flavor infusion apparatus with a single unit design showing all major components with a chamber pressure control system, according to an embodiment of this invention.

FIG. 3 is a perspective view of an EVC cooling and food flavor infusion apparatus with a single unit design showing all major components with a chamber pressure control system, according to an embodiment of this invention. The EVC cooling and food flavor infusion apparatus 10 comprises a food chamber 12, a trolley being rolled inside the food chamber 16, food pans on the trolley 18, an instrument panel 20, a cold trap 32, a vacuum pump 34, a vacuum control valve 36, an outflow air outlet 33, a refrigeration unit 35, an electrical panel 38, an inline air filter 41, an inflow air control valve 42, an inflow air inlet 43, temperature sensors 44, a humidity sensor 46, a pressure sensor 48, and a 1-Input-2-Output controller 40.

In FIG. 3, the components 12, 16, 18, 32, 33, 34, 35, 36, and 38 have been described in FIGS. 1 and 2. The temperature sensors 44, humidity sensor 46, and pressure sensor 48 are part of the instrument panel 20 in FIGS. 1 and 2. The actual sensor probes are installed inside the food chamber at different locations. For instance, there can be multiple temperature sensor probes that are inserted into food samples in different food pans to measure the food temperature. The humidity sensor probe and pressure sensor probe are typically installed at the top of the food chamber.

In FIG. 3, the 1-Input-2-Output controller 40 can provide adaptive chamber pressure control for the food chamber. In order to avoid liquid splash, it is important to control the chamber pressure based on a pre-determined pressure setpoint trajectory that is derived based on food types, viscosity, chamber pressure, food temperature, and boiling point temperature. For food flavor infusion, the foodstuff is submerged under the marinade or brine, which typically have low viscosity. The chamber pressure setpoint trajectory for brining shall be determined based on the viscosity of salt water, and the pressure setpoint trajectory for marinating should be derived based on the viscosity of a specific marinade. The chamber pressure control system is described in more details in FIGS. 8 to 11.

Figure 4:
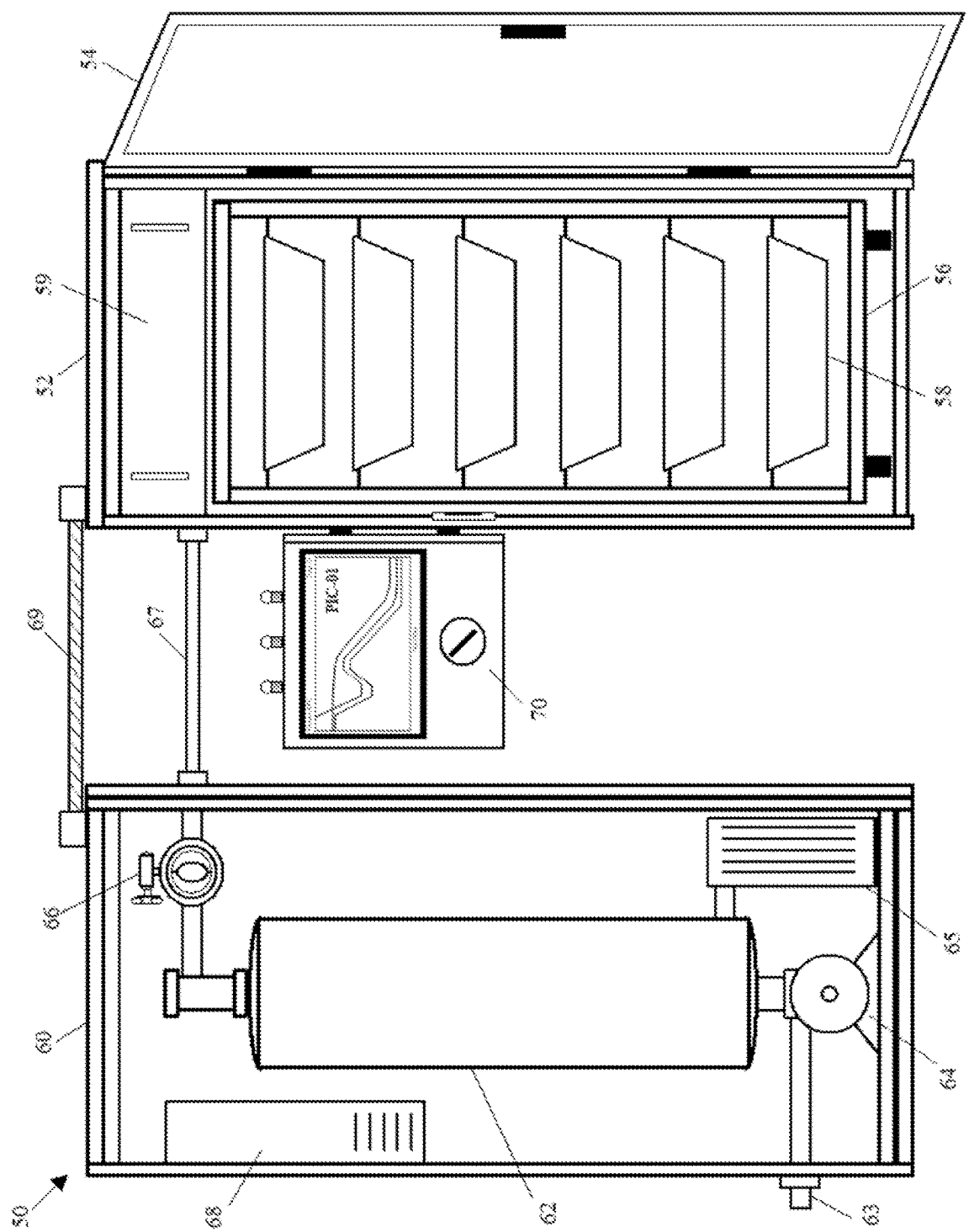
FIG. 4 is a perspective view of an EVC cooling and food flavor infusion apparatus with a dual module design including a food chamber module and a utility module, according to an embodiment of this invention.

FIG. 4 is a perspective view of an EVC cooling and food flavor infusion apparatus with a dual module design including a food chamber module and a utility module, according to an embodiment of this invention.

The EVC cooling and food flavor infusion apparatus 50 comprises a food chamber 52, a chamber door 54, a trolley being rolled inside the food chamber 56, food pans on the trolley 58, an instrument panel 59, a utility module 60, a cold trap 62, a vacuum pump 64, a vacuum control valve 66, an outflow air outlet 63, a refrigeration unit 65, an electrical panel 68, a vacuum air connection tubing and connectors 67, an electrical and signal wire conduit 69, and a control and monitoring module 70.

Compared with the single unit design of the EVC apparatus in FIGS. 1 to 3, this is a dual-module design that separates the food chamber and the utility module. It is suitable for rapid cooling and food flavor infusion applications where the total payload is relatively large such as between 100 to 300 pounds. The benefits of the dual-module design are many. For instance, the food chamber and the utility module can be built with limited size and weight for easier transportation and installation.

In FIG. 4, the food chamber 52 is built so that it can work in extremely low pressure conditions. In this embodiment, the extremely low pressure conditions can be defined as being less than or equal to about 0.1 ATM or 10 kPa. The chamber door 54 allows easy access to the food chamber and can seal the food chamber from the atmosphere pressure. Since the apparatus can operate at extremely low pressure conditions, the food chamber and its door are specially designed and built to deal with the pressure difference of the atmosphere pressure and 0 Pascal vacuum pressure, which is about 100 kPa. The food pan trolley 56 is built in stainless steel with multiple racks to hold food pans or trays. The foodstuffs such as meats, vegetables, noodles, and soup are put inside the food pans 58. The instrument panel 59 comprises sensors, an inflow air control valve, electrical wires, and signal wires.

Inside the utility module 60, the cold trap 62 is used to condense water vapor from the food chamber back to liquid form. The vacuum pump 64 can pump air out of the food chamber to reach extremely low pressure conditions. The vacuum control valve 66 is used to isolate the cold trap 62 and food chamber 52. In addition, the valve can regulate the outflow air when the vacuum pump 64 is running to pump the air out of the food chamber. Therefore, it is used as one of the actuators to control the chamber pressure. The refrigeration unit 65 is used to cool down the cold trap 62 to condense water vapor. The outflow air outlet 63 allows the air to be pumped out to the atmosphere. The vacuum air tubing and connectors 67 can connect the food chamber and the cold trap so that air can be pumped out from the food chamber through the cold trap. The electrical and signal wire conduit 69 houses the electrical wires and signal wires between the food chamber and the utility module. The control and monitoring module 70 can be attached to the food chamber cabinet with a bracket mount.

Figure 5:
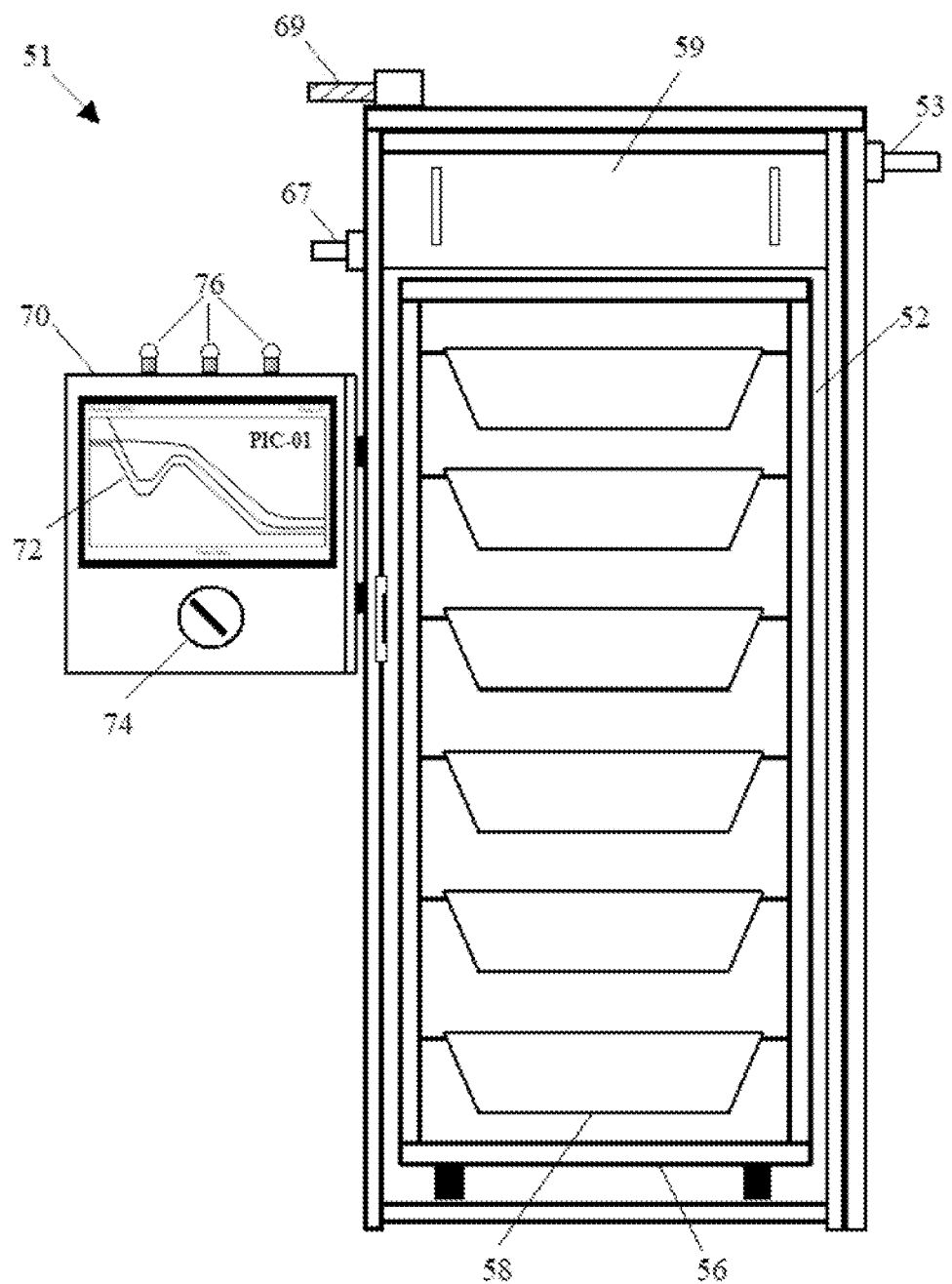
FIG. 5 is a perspective front view of a food chamber module with key components for the EVC cooling and food flavor infusion apparatus, according to an embodiment of this invention.

FIG. 5 is a perspective front view of a food chamber module with key components for the EVC cooling and food flavor infusion apparatus, according to an embodiment of this invention. The food chamber module 51 comprises a food chamber 52, a trolley being rolled inside the food chamber 56, food pans on the trolley 58, an inflow air inlet 53, an instrument panel 59, a vacuum air connection tubing and connectors 67, an electrical and signal wire conduit 69, a control and monitoring module 70, a control and monitoring computer with HMI screen 72, a system power switch 74, and system status lights 76, The components 52, 56, 58, 59, 67, and 69 have been described in FIG. 4. The inflow air inlet allows the air to flow inside the food chamber to return the chamber pressure to atmosphere pressure. The inflow air is also important in chamber pressure control when we need to raise the chamber pressure by adding clean air to the chamber to avoid liquid splash events from happening. The control and monitoring computer with HMI screen 72 can provide chamber pressure control and logic control for the apparatus, and the human-machine-interface (HMI) screen allows the user to operate the apparatus. The control and monitoring computer with HMI screen can be implemented with a few options, including: (a) an industrial personal computer (PC) with Windows or Linux operating system, (b) a programmable logic controller (PLC), (c) a programmable automation controller (PAC), (d) a specially designed control device, and (e) a combination thereof.

The system power switch 74 can turn on or off the power of the apparatus. The system status lights 76 can be designed with three lights. For instance, (a) a shining green light indicates the apparatus is in normal operation when the chamber pressure is at or below the atmosphere pressure; (b) a shining orange light indicates the chamber door is open and the system is not ready to start the vacuum operation; and (c) a shining red light indicates the system is in error or needs human attention.

Figure 6:
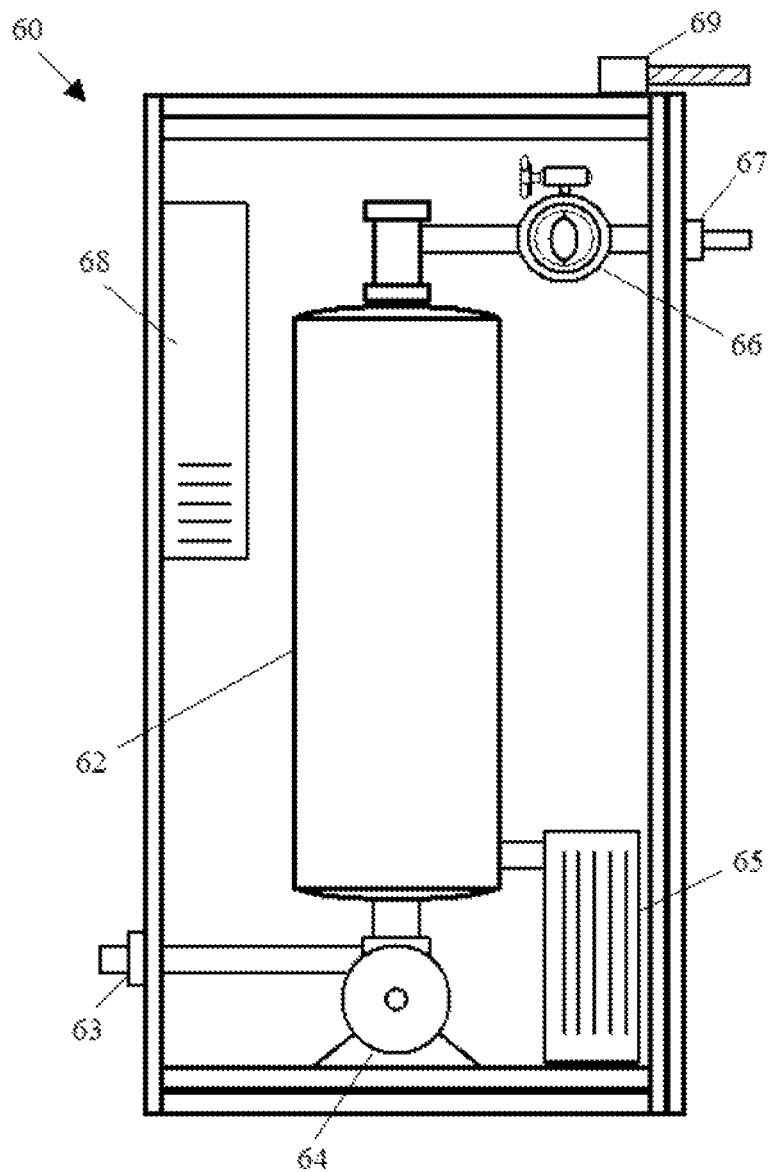
FIG. 6 is a perspective view of a utility module with key components for the EVC cooling and food flavor infusion apparatus, according to an embodiment of this invention.

FIG. 6 is a perspective view of a utility module with key components for the EVC cooling and food flavor infusion apparatus, according to an embodiment of this invention. The utility module 60 comprises a cold trap 62, a vacuum pump 64, an outflow air outlet 63, a vacuum control valve 66, a refrigeration unit 65, an electrical panel 68, a vacuum air connection tubing and connectors 67, and an electrical and signal wire conduit 69.

In FIG. 6, the components 62, 64, 65, 66, 67, and 69 have been described in FIG. 4. The outflow air outlet 63 is connected to the vacuum pump 64 and allows the air going out to the atmosphere. The electrical panel 68 can receive electric power and supply the power to run the apparatus. Since the apparatus is for the global market, different electric standards in the world can be supported. Therefore, the apparatus can be designed to take either 3-phase AC power or single-phase AC power from the local electric grid.

Figure 7:
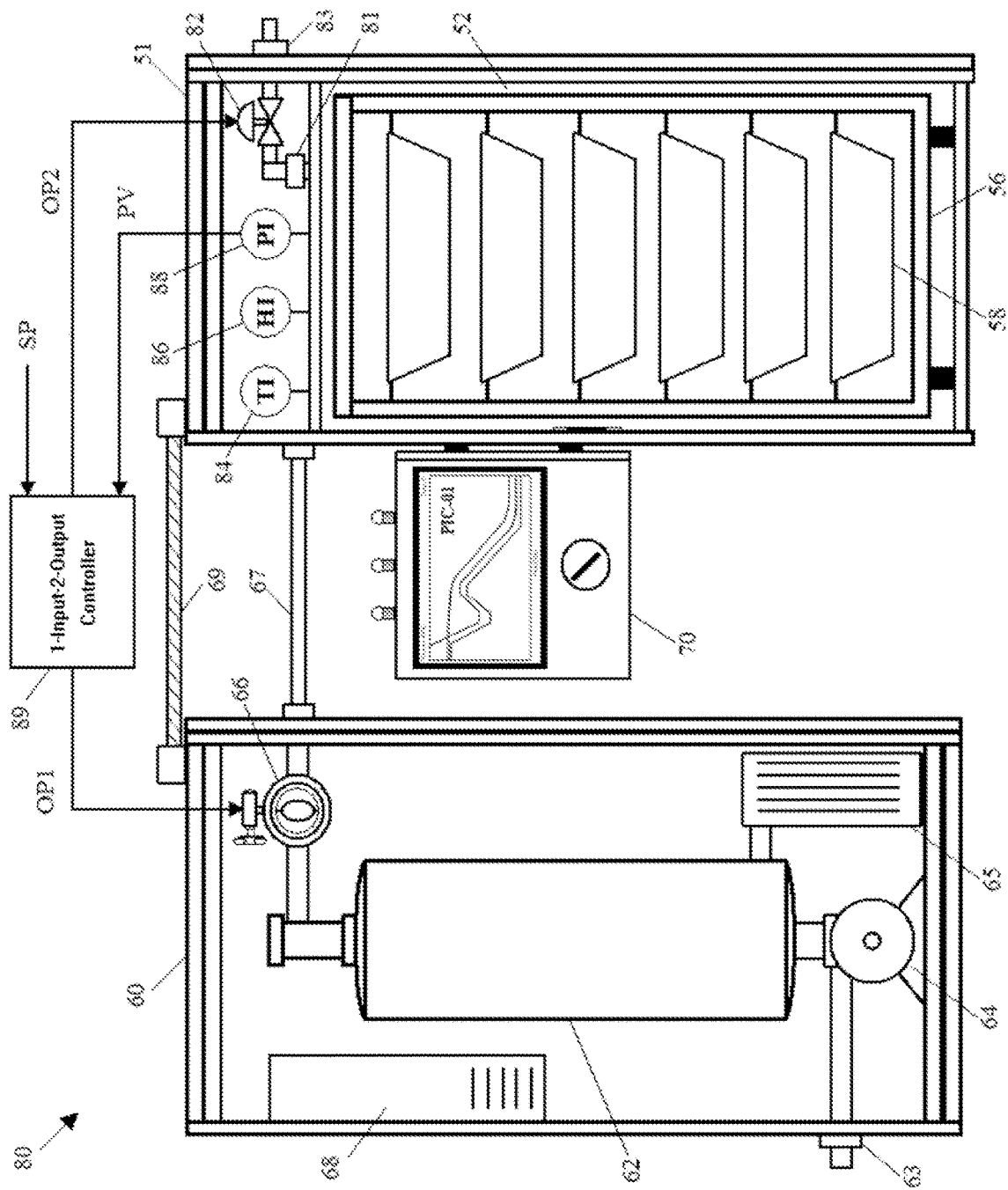
FIG. 7 is a perspective view of an EVC cooling and food flavor infusion apparatus with a dual module design showing all major components with a chamber pressure control system, according to an embodiment of this invention.

FIG. 7 is a perspective view of an EVC cooling and food flavor infusion apparatus with a dual module design showing all major components with a chamber pressure control system, according to an embodiment of this invention. The EVC cooling and food flavor infusion apparatus 80 comprises a food chamber module 51, a utility module 60, and a control and monitoring module 70. Within these 3 main modules, the apparatus 80 further comprises: a food chamber 52, a trolley being rolled inside the food chamber 56, food pans on the trolley 58, a cold trap 62, a vacuum pump 64, a refrigeration unit 65, a vacuum control valve 66, an electrical panel 68, a vacuum air connection tubing and connectors 67, an electrical and signal wire conduit 69, an inflow air control valve 82, an inline air filter 81, an inflow air inlet 83, temperature sensors 84, a humidity sensor 86, a pressure sensor 88, and a 1-Input-2-Output controller 89.

The components 52, 56, 58, 62, 64, 65, 66, 67, 68, and 69 have been described in FIGS. 4 to 6. The vacuum control valve 66 is used to isolate the cold trap 62 and the food chamber 52, and can regulate the outflow air when the vacuum pump 64 is running to pump the air out of the food chamber. Therefore, it is used as one of the actuators to control the chamber pressure. The inflow air control valve 82 can regulate the inflow air flow so that it is used as the other actuator for chamber pressure control. The inflow air control valve 82 can also be used as a vent valve. When it is fully opened, air can enter the food chamber freely so that the chamber pressure can return to atmosphere pressure. This is an important step before opening the chamber door to retrieve the rolling trolley and food pans. The inline air filter 81 is used to filter the inflow air so that it is clean for the food chamber. The inflow air inlet 83 allows the air to enter the food chamber through the inflow air control valve 82.

In FIG. 7, the temperature sensors, humidity sensor, and pressure sensor are part of the instrument panel 59 in FIGS. 4 and 5. The actual sensor probes are installed inside the food chamber at different locations. For instance, there can be multiple temperature sensor probes that are inserted to food samples in different food pans to measure the food temperature. The humidity sensor probe and pressure sensor probe are typically installed at the top of the food chamber.

In FIG. 7, the 1-Input-2-Output controller 89 can provide adaptive pressure control for the food chamber. In order to avoid liquid splash, it is important to control the chamber pressure based on a pre-determined pressure setpoint trajectory that is derived based on food types, viscosity, chamber pressure, food temperature, and boiling point temperature. For food flavor infusion, the foodstuff is submerged under the marinade or brine, which typically have low viscosity. The chamber pressure setpoint trajectory for brining shall be determined based on the viscosity of salt water, and the pressure setpoint trajectory for marinating should be derived based on the viscosity of a specific marinade. The chamber pressure control system is described in more details in FIGS. 8 and 9.

B. Adaptive Chamber Pressure Control for the EVC Apparatus

Figure 8:
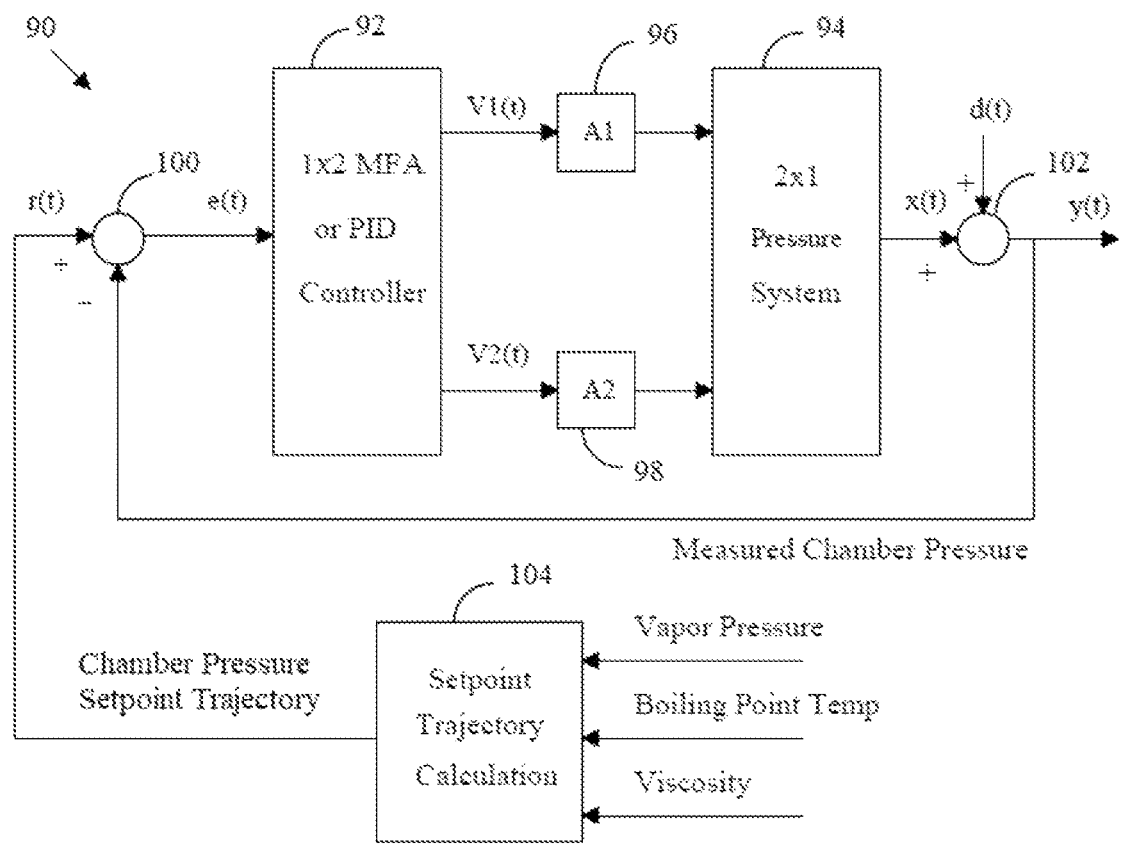
FIG. 8 is a diagram of a 2-Input-1-Output (2×1) pressure control system to control the chamber pressure of the EVC cooling and food flavor infusion apparatus, according to an embodiment of this invention.

FIG. 8 is a diagram of a 2-Input-1-Output (2×1) pressure control system to control the chamber pressure of the EVC cooling and food flavor infusion apparatus, according to an embodiment of this invention. The 2-Input-1-Output (2×1) pressure control system 90 comprises a 1-input-2-output (1×2) controller 92, a 2-input-1-output (2×1) system 94, actuator $A_1$ 96, actuator $A_2$ 98, signal adders 100, 102, and a setpoint trajectory calculation mechanism 104. The signals shown in FIG. 8 are as follows:

r(t)—Setpoint.
y(t)—Measured Variable or the Process Variable, y(t)=x(t)+d(t).
x(t)—System Output.
$V_1(t)$—Controller Output 1 to manipulate Actuator $A_1$.
$V_2(t)$—Controller Output 2 to manipulate Actuator $A_2$.
d(t)—Disturbance, the disturbance caused by noise or load changes.
e(t)—Error between the Setpoint and Measured Variable, e(t)=r(t)−y(t).

The control objective is for the controller to produce outputs $V_1(t)$ and $V_2(t)$ to manipulate actuators $A_1$ and $A_2$ so that the measured variable y(t) tracks the given trajectory of its setpoint r(t) under variations of setpoint, disturbance, and process dynamics. In other words, the task of the controller is to minimize the error e(t) in real-time.

Automatic control of the chamber pressure of the EVC apparatus can be a challenge when using a traditional control method. We have to control the chamber pressure based on a varying pressure setpoint trajectory. In addition, the same pressure control system has to deal with varying food types, payload changes, and other uncertainties. Fundamentally, the 1×2 pressure controller has only 1 input, which is the control error e(t) but has to produce 2 control outputs $V_1(t)$ and $V_2(t)$ to manipulate 2 actuators, the vacuum control valve and the inflow air control valve, simultaneously.

In U.S. Pat. No. 7,142,626, Apparatus and Method of Controlling Multi-Input-Single-Output Systems, a 2-Input-1-Output (2×1) Model-Free Adaptive (MFA) control system is described. The Model-Free Adaptive (MFA) control technology as described in U.S. Pat. Nos. 7,142,626, 6,055,524, and 6,556,980 is an artificial intelligence (AI) technology that uses an artificial neural network (ANN) as a key component of the controller. In U.S. patent application No.

17,469,712, adaptive chamber pressure control using Model-Free Adaptive (MFA) control technology has been described.

Figure 9:
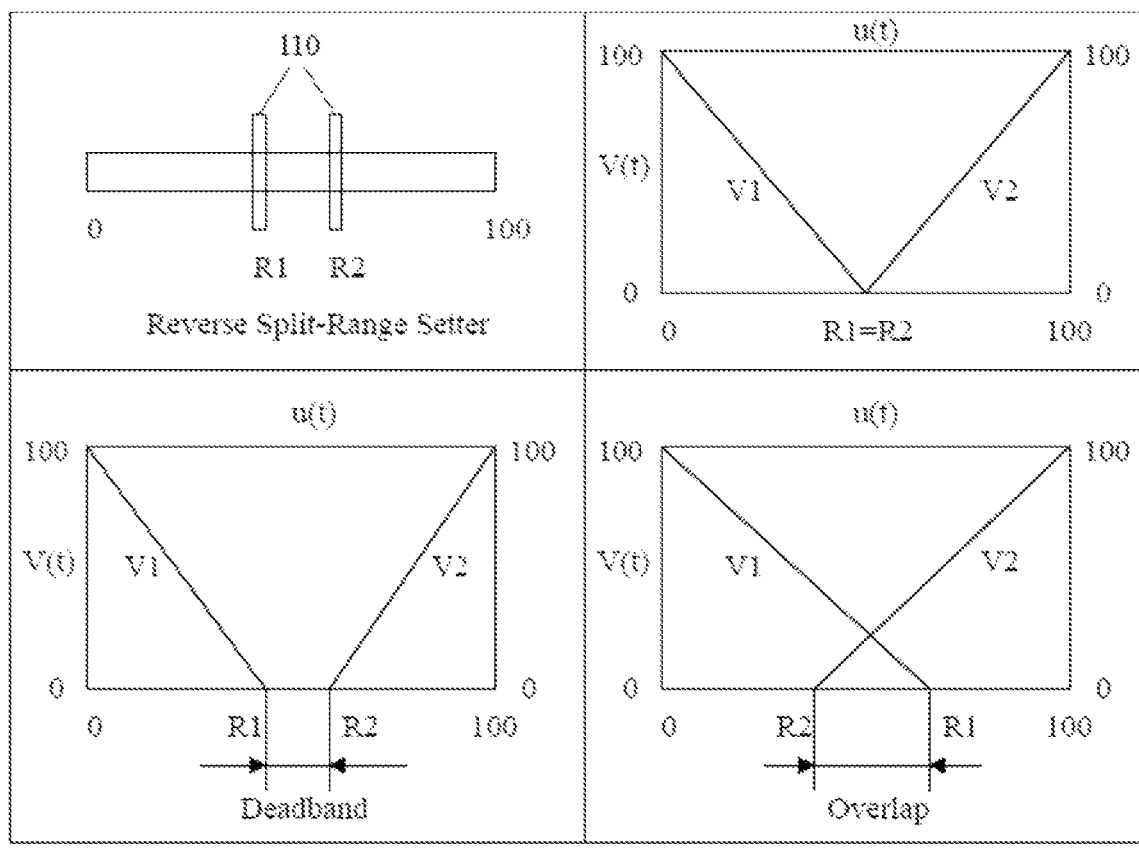
FIG. 9 is a drawing illustrating a mechanism of a reverse split-range setter that can split the controller signal into 2 ranges to manipulate the vacuum control valve and inflow air control valve, according to an embodiment of this invention.

FIG. 9 is a drawing illustrating a mechanism of a reverse split-range setter that can split the controller signal into 2 ranges to manipulate the vacuum control valve and inflow air control valve, according to an embodiment of this invention.

By moving and setting the knobs $R_1$ and $R_2$ 110, respectively, the controller outputs $V_1(t)$ and $V_2(t)$ are calculated based on the following formulas as implemented in the split-range setter mechanism 110:

$$V_1(t) = -100\frac{u(t)}{R_1} + 100, \text{ for all } u(t) \in [0, R_1] \quad (1a)$$

$$V_1(t) = 0, \text{ for all } u(t) \in (R_1, 100] \quad (1b)$$

where $0 < R_1 \leq 100$, which defines the split range of u(t) for controller output $V_1(t)$; and $$V_2(t) = -100\frac{u(t) - 100}{R_2 - 100} + 100, \text{ for all } u(t) \in [R_2, 100] \quad (2a)$$

$$V_2(t) = 0, \text{ for all } u(t) \in [0, R_2) \quad (2b)$$

where $0 \leq R_2 < 100$, which defines the split range of u(t) for controller output $V_2(t)$. The signals u(t), $V_1(t)$, and $V_2(t)$ all have a working range of 0% to 100%. In this design, the control valves are shut at 0% during their off position. We can move and set the $R_1$ and $R_2$ knobs freely within its (0, 100) range to produce controller outputs $V_1(t)$, and $V_2(t)$, where there may be a deadband, or an overlap, or no gaps in between.

In EVC apparatus chamber pressure control, there are 3 working conditions:
(1) the vacuum control valve is open and inflow air flow valve is closed, chamber pressure is decreasing;
(2) both vacuum control valve and inflow air control valve are closed, chamber pressure is holding steady; and
(3) the vacuum control valve is closed and inflow air flow valve is open, chamber pressure is increasing.

Then, we can move and set the $R_1$ and $R_2$ knobs to have an adequate deadband to support all 3 working conditions. For instance, we can set the $R_{1=40}$, and $R_{2=60}$. When u(t)<40, the vacuum control valve is open to move air out of the chamber causing the chamber pressure to decrease. Inside the deadband, where 40<u(t)<60, $V_1(t)=V_2(t)=0$ forcing both control valves to be closed. When u(t)>60, the inflow air control valve is open. Clean air flows into the chamber causing the pressure to increase.

U.S. Pat. No. 7,142,626 also described 2×1 PID (Proportional-Integral-Derivative) control systems which could potentially be useful for chamber pressure control for the EVC apparatus. When the Derivative action is taking out of a PID controller, it becomes a PI controller. When the Integral action is taking out of a PI controller, it becomes a P controller. Both PI and P controllers could potentially be useful for chamber pressure control, although their performance will not be as good as an MFA controller.

C. Design of Chamber Pressure Setpoint Trajectory for Flavor Infusion

As defined in the opening section of this specification, Extreme Vacuum Cooling (EVC) is vacuum cooling at extremely low pressure conditions with vacuum chamber pressure control and added clean dry air or inert gas. The EVC apparatus disclosed in this patent can marinate or brine meats, vegetables, and fruits.

One major challenge for the EVC apparatus is the potential liquid splash problem for Type B Foods and for food flavor infusion. When the pressure difference between the chamber pressure and vapor pressure of water inside the food is too high, excessive bubbling can occur due to rapid evaporation. For low viscosity foods, such as soups and sauces, and for food flavor infusion with brine and marinade, this liquid splash problem is the main road block for the users. It is important to control the chamber pressure carefully for Type B Foods and for food flavor infusion so that the pressure difference between the chamber pressure and vapor pressure is managed properly and automatically to enable rapid cooling but have no liquid splash events.

Figure 10:
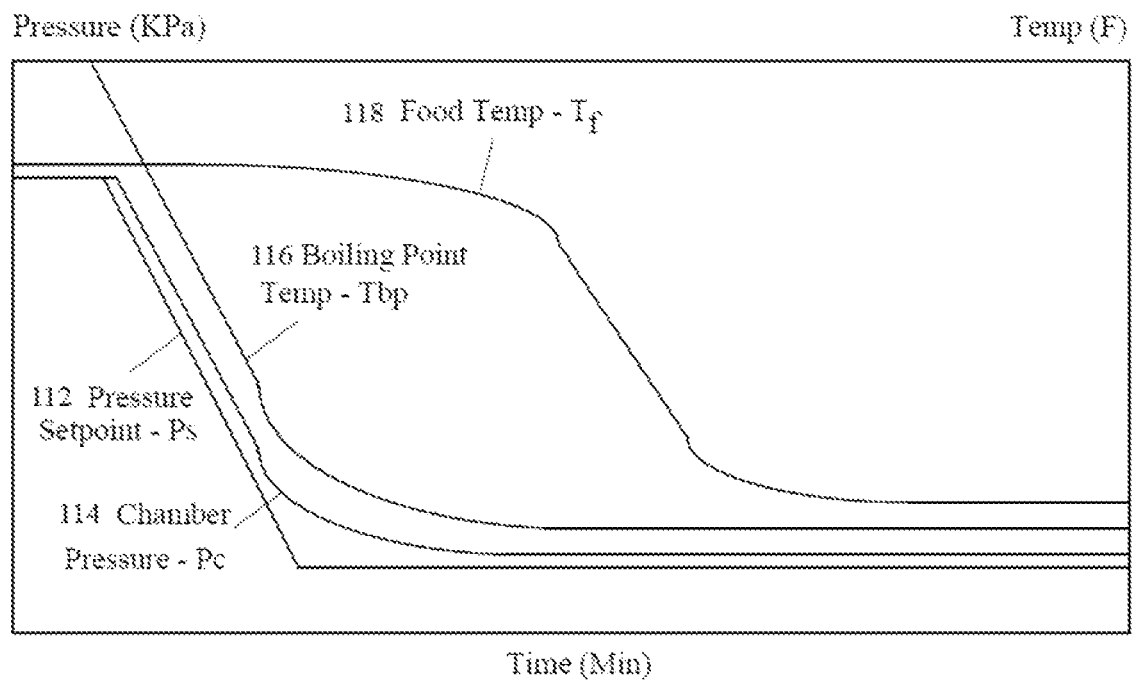
FIG. 10 is a time-amplitude diagram that shows a chamber pressure setpoint trajectory for cooling high viscosity foods, controlled chamber pressure, boiling point temperature, and food temperature, according to an embodiment of this invention.

FIG. 10 is a time-amplitude diagram that shows a chamber pressure setpoint trajectory for cooling high viscosity foods, controlled chamber pressure, boiling point temperature, and food temperature, according to an embodiment of this invention. The diagram comprises trends for the pressure setpoint Ps 112, chamber pressure Pc 114, boiling point temperature Tbp 116, and food temperature Tf 118.

Since the liquid splash events do not happen for Type A Foods, we can reduce the vacuum pressure more aggressively based on the capability of the EVC apparatus. For instance, the vacuum pressure setpoint Ps 112 can be designed to change from atmosphere pressure (1.0 ATM or 100 KPa) to extremely low pressure (0.01 ATM or about 1.0 KPa) to achieve rapid vacuum cooling. The chamber pressure Pc 114 can be controlled to track its setpoint Ps. In this case, the 1×2 pressure controller described in Section B will work in its OP range between 0 to 40 to manipulate the vacuum control valve and achieve pressure control, while the inflow air control valve is closed.

The boiling point of a substance is the temperature at which the vapor pressure of a liquid equals the pressure surrounding the liquid when the liquid changes into a vapor. Therefore, in the vacuum chamber, the boiling point temperature of water inside the food is directly related to the chamber pressure. It can be seen that the boiling point temperature Tbp 116 of the water inside the food changes along with the chamber pressure Pc 114. The food inside the chamber cools down gradually and its temperature is measured by the temperature sensors to produce the Food Temp Tf. Please note that there is a time lag between Tbp 116 and Tf 118. For Type A Foods, this temperature difference is not an issue.

For Type A Foods, the chamber pressure setpoint trajectory can be based on the following formula as illustrated in FIG. 10:

$$Ps(t) = Pi(0) - a*t; \text{ During initial ramp down period;} \quad (3a)$$

$$Ps(t) = C; \text{ During the holding and endpoint period.} \quad (3b)$$

In these formulas, Pi(0) is the initial value of the chamber pressure, constant a is the slope of pressure ramp down, and constant C is the pressure setpoint for the EVC apparatus to run at a fixed vacuum pressure. The actual values of the slope and constants are related to the EVC apparatus capability, food viscosity, total weight, and the difference between boiling point temperature and food temperature, etc. They can be derived through experiments and stored in cooling recipes as pre-determined values. Please note, for Type B Foods, if we run the EVC apparatus based on the pressure setpoint trajectory showing in FIG. 10, the big temperature difference of Tbp and Tf can cause liquid splash.

Figure 11:
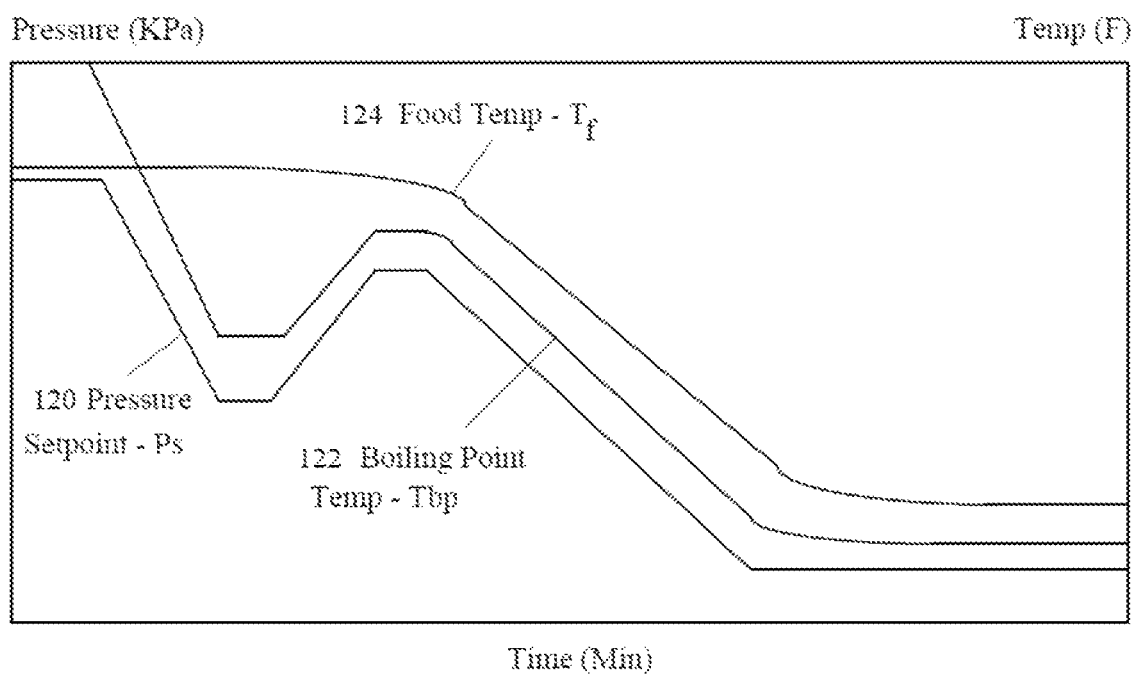
FIG. 11 is a time-amplitude diagram that shows a chamber pressure setpoint trajectory for cooling low viscosity foods and for food flavor infusion, as well as boiling point temperature and food temperature, according to an embodiment of this invention.

FIG. 11 is a time-amplitude diagram that shows a chamber pressure setpoint trajectory for cooling low viscosity foods and for food flavor infusion, as well as boiling point temperature and food temperature, according to an embodiment of this invention.

As explained in the opening section of this document, if the pressure difference between the chamber pressure and vapor pressure of water inside the food is too high, excessive bubbling can occur due to rapid evaporation. When the bubbles burst at the food surface, the force of the bubble surface tension can cause the liquid splash inside the chamber for Type B Foods. It is important to control the chamber pressure carefully for Type B Foods and for food flavor infusion so that the pressure difference between the chamber pressure and vapor pressure is managed in such a way that the EVC apparatus can enable rapid cooling or flavor infusion while avoid liquid splash events.

Since the boiling point temperature has a direct relationship with the chamber pressure, we can also control the chamber pressure with constraints based on the difference between the boiling point temperature and food temperature to avoid liquid splash for Type B Foods. As illustrated in FIG. 11, the chamber pressure setpoint Ps 120 can be reduced at the beginning to give a kick start for vacuum cooling. In this drawing, the measured chamber pressure is not shown but should track the pressure setpoint. In this case, we can assume the chamber pressure is equivalent to the pressure setpoint. The boiling point temperature Tbp 122 comes down as the chamber pressure comes down. After that, we can intentionally hold the pressure for a while and then increase the chamber pressure by closing the vacuum valve and adding clean dry air into the chamber to reach a pressure level and wait there before the food temperature Tf 124 starts to fall. The goal of adding clean air is to raise the chamber pressure and maintain a temperature difference between Tbp and Tf so that liquid splash will not happen.

As illustrated in FIG. 11, the chamber pressure setpoint trajectory can be calculated based on vapor pressure, boiling point temperature, and viscosity. The formulas to calculate vapor pressure and boiling point temperature relating to viscosity that can be used in this embodiment are any of known techniques described in the book Perry's Chemical Engineers' Handbook, by Don Green and Marylee Z. Southard, published by McGraw-Hill Education, wherein the book and its contents are herein expressly incorporated by reference, in their entirety.

Without losing generality, we can design the chamber pressure setpoint Ps(t) for cooling Type B Foods and for food flavor infusion based on the following formula, which is illustrated in FIG. 11:

$Ps(t)=Pi(0)-a*t$; During initial ramp down period; (4a)

$Ps(t)=C1$; During the first holding period; (4b)

$Ps(t)=C1+b*t$; During the ramp up period; (4c)

$Ps(t)=C2$; During the second holding period; (4d)

$Ps(t)=C2-d*t$; During the second ramp down; (4e)

$Ps(t)=C3$, During the endpoint period. (4f)

In these formulas, Pi(0) is the initial value of the chamber pressure, constants a, b, and d are the slopes of pressure ramp down, ramp up, and final ramp down. Constants C1, C2, and C3 are the pressure setpoints for the EVC apparatus to run at a fixed vacuum pressure. The actual values of the slopes and constants are related to the EVC apparatus capability, food viscosity, total weight, and the difference between boiling point temperature and food temperature, etc. They can be derived through experiments and stored in cooling or flavor infusion recipes as pre-determined values. When doing the experiments, the food or marinade viscosity can be measured using a viscosity analyzer.

For food flavor infusion, salt water is usually used for brining. Marinade can include soy sauce, Teriyaki sauce, buttermilk, yogurt, tomato sauce, wine, liquor, vinegar, *Papaya* juice, orange juice, kiwi juice, pineapple juice, apple juice, olive oil, salt water, or a combination of these ingredients. Viscosity for marinade can be quite different. The chamber pressure setpoint trajectory for marinating can be derived through certain formulas and experiments and saved in a computer database. The user can retrieve the trajectory as part of the brining or marinating recipe when using the EVC cooling and flavor marinating apparatus.

D. Methods of Extreme Vacuum Cooling for Food Flavor Infusion

Figure 12:
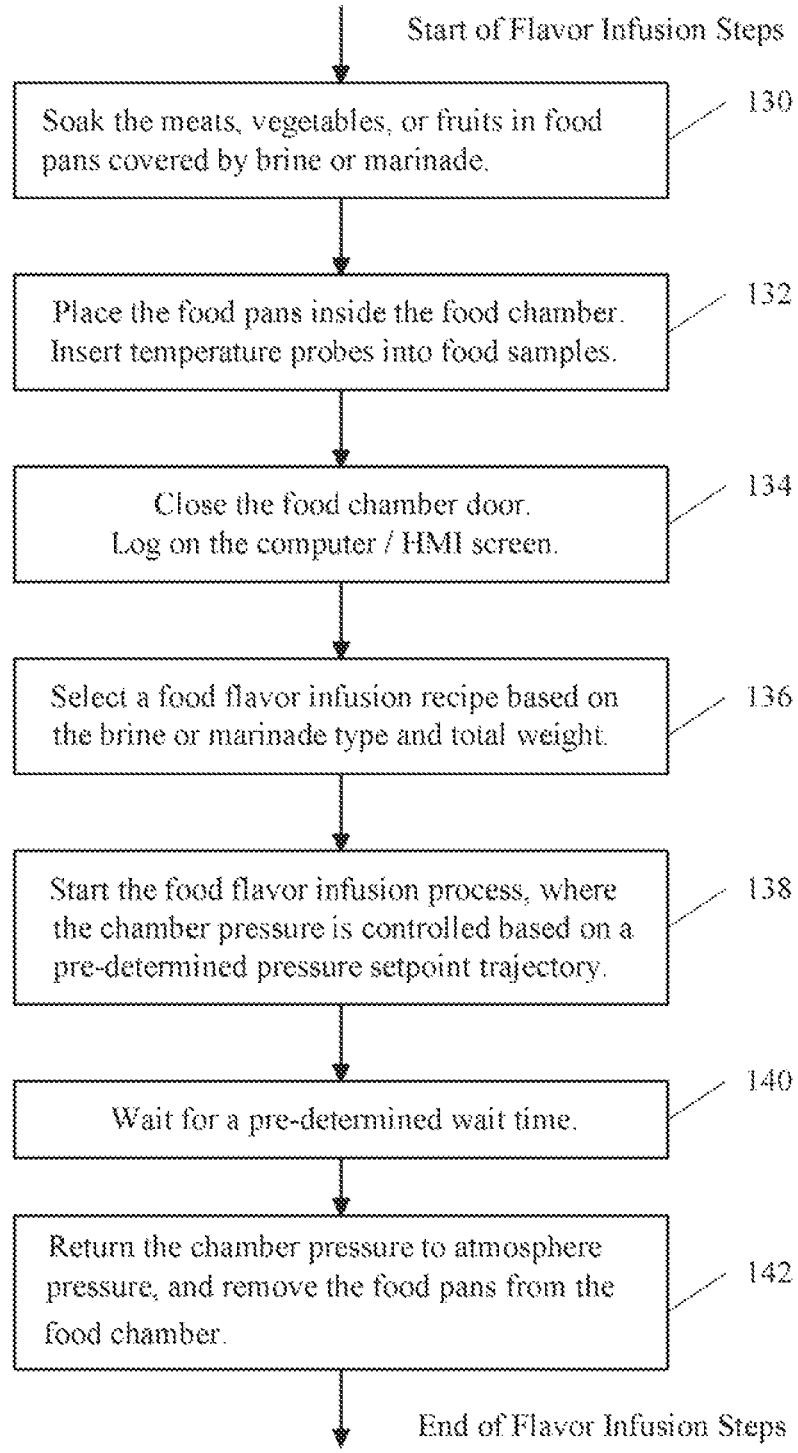
FIG. 12 is a block diagram illustrating the steps of a method for marinating or brining foods using the EVC food flavor infusion apparatus illustrated in FIGS. 1 to 8, according to an embodiment of this invention.

FIG. 12 is a block diagram illustrating the steps of a method for marinating or brining foods using the EVC food flavor infusion apparatus illustrated in FIGS. 1 to 11, according to an embodiment of this invention.

The food flavor infusion steps start at Block 130, where meats, vegetables, and fruits are soaked in food pans covered by marinade or brine. At Block 132, food pans with food for brining or marinating are placed inside the food chamber of the EVC apparatus. In addition, multiple temperature sensor probes are inserted into food samples for food temperature measurement. An average value can be used as food temperature Tf for temperature monitoring and chamber pressure setpoint trajectory calculations as described in Section C.

At Block 134, the operator closes the chamber door, and then logs onto the control and monitoring computer with HMI screen. At Block 136, a food flavor infusion recipe is selected from a recipe selection menu relating to the brine or marinade type and the total weight of the food inside the chamber. The chamber pressure setpoint trajectory calculation is very much related to the Food Type A or B, or the marinade type as illustrated in FIGS. 10 and 11.

At Block 138, the operator starts the food flavor infusion process, where the chamber pressure is controlled based on a pre-determined pressure setpoint trajectory. At Block 140, the operator waits for a pre-determined time. At Block 142, the brining or marinating process is finished and the food chamber pressure is returned to atmosphere pressure. Then the food pans are removed from the food chamber.

E. Conclusion

The motivation to develop Extreme Vacuum Cooling (EVC) technology and products fits the mega trend of the food industry transformation. Similar to a semiconductor foundry or fab, a food foundry is a modern commercial kitchen or food processing plant that can produce large amounts of food with special recipes in small packages to serve dedicated or targeted customer groups. In a food fab, the large amount of food needs to be cooked and chilled for future consumption.

In a commercial kitchen, chefs and workers need to prepare large amounts of food with certain time limitations.

To make food have better and more unique taste, they often marinate and brine the meats and vegetables before cooking. However, food marinating or brining using conventional methods can take many hours to days, which can become a main bottleneck for the commercial kitchen. The foodstuff being brined or marinated still needs to be put in a cooled environment to meet food safety standards. Therefore, it is desirable to provide a food flavor infusion apparatus that can enable the chefs to marinate, cook, and cool large amounts of food in a much shorter time.

Chilling foods rapidly to get cooked foods out of danger zones to meet food safety standards and marinating foods efficiently to save energy and manpower are the main objectives of this invention.

The inventors of this patent have many years of experience in technology innovation to serve or even lead the mega trends in the transformation in industrial automation, renewable energy, and semiconductor equipment. It is our goal to contribute to and support the food industry and our society where people are looking for healthier, more flavorful, and affordable foods.

The invention claimed is:

1. An apparatus for cooling, marinating, and brining foods capable of operating at extremely low pressure conditions, comprising:
   a) a food chamber being able to work in extremely low pressure conditions;
   b) a vacuum pump arranged to pump air out of the food chamber to reach extremely low pressure conditions;
   c) a cold trap arranged to condense water vapor from the food chamber back to liquid form;
   d) a vacuum control valve arranged to isolate the cold trap and food chamber, and to regulate the exhaust air flow;
   e) an inflow air control valve arranged to regulate the added clean air flows and serve as a vent valve to allow the food chamber to get back to atmosphere pressure;
   f) an electrical panel arranged to receive electric power and supply the power to the apparatus; and
   g) a control and monitoring computer with a Human-Machine-Interface (HMI) screen that enables chamber pressure control and allows the user to operate the apparatus;
   h) an inline air filter to filter the inflow air;
   i) A refrigeration unit being used to cool down the cold trap;
   j) a plurality of temperature sensors whose probes can be inserted to food samples in food pans to measure food temperatures;
   k) a pressure sensor used to measure the pressure of the food chamber; and
   l) A humidity sensor usable to measure the humidity of the food chamber;
   wherein the apparatus comprises a 2-Input-1-Output (2×1) pressure control system to control the food chamber pressure, further comprising:
   a) a 1-input-2-output (1×2) pressure controller;
   b) a 2-input-1-output (2×1) pressure system;
   c) an actuator 1 being the vacuum control valve;
   d) an actuator 2 being the inflow air control valve; and
   e) a pressure setpoint trajectory calculation mechanism.

2. The apparatus of claim 1, in which the food chamber has multiple racks to hold food pans or a rolling trolley that holds multiple food pans.

3. The apparatus of claim 1, in which the extremely low pressure conditions have chamber pressure less than or equal to 0.1 ATM or 10 kPa.

4. The control system of claim 1, wherein the 1-input-2-output (1×2) pressure controller is a Model-Free Adaptive (MFA) controller, a Proportional-Integral-Derivative (PID) controller, a Proportional-Integral (PI) controller, or a Proportional controller (P), comprising a split-range setter to produce control output 1 and 2 to manipulate actuator 1 and 2.

5. The 1×2 pressure controller of claim 4, in which the split-range setter produces controller outputs of the form:

$$V_1(t) = -100\frac{u(t)}{R_1} + 100, \quad \text{for all } u(t) \in [0, R_1]$$

$$V_1(t) = 0, \quad \text{for all } u(t) \in (R_1, 100]$$

$$V_2(t) = -100\frac{u(t) - 100}{R_2 - 100} + 100, \quad \text{for all } u(t) \in [R_2, 100]$$

$$V_2(t) = 0, \quad \text{for all } u(t) \in [0, R_2)$$

or an equivalent thereof, in which $0 < R_1 \leq 100$, $0 \leq R_2 < 100$, the signals $u(t)$, $V_1(t)$, and $V_2(t)$ all having a working range of 0 to 100.

6. The control system of claim 1, wherein the pressure setpoint trajectory calculation mechanism can produce a setpoint for the controller to control the food chamber pressure to avoid liquid splash events for food flavor infusion, in which the setpoint trajectory is generated in the following form:
   Ps(t)=Pi(0)−a*t; During initial ramp down period;
   Ps(t)=C1; During the first holding period;
   Ps(t)=C1+b*t; During the ramp up period;
   Ps(t)=C2; During the second holding period;
   Ps(t)=C2−d*t; During the second ramp down period;
   Ps(t)=C3, During the endpoint period;
   or an equivalent thereof, in which Pi(0)>0 is the initial chamber pressure, and a>0, b>0, d>0, C1>0, C2>0, C3>0 are pre-determined constants being used in cooling recipes.

7. The control and monitoring computer with HMI screen of claim 1 being implemented with an industrial personal computer (IPC), or a programmable logic controller (PLC), or a programmable automation controller (PAC), or a specially designed control device, or a combination thereof.

8. An apparatus for cooling, marinating, or brining food capable of operating at extremely low pressure conditions, comprising:
   a) a food chamber module, comprising:
      (i) a food chamber being able to work in extremely low pressure conditions;
      (ii) a rolling trolley that can hold multiple food pans or trays;
      (iii) an inflow air control valve arranged to regulate the added clean air flows and serve as a vent valve to allow the food chamber to get back to atmosphere pressure; and
      (iv) an instrument panel;
      (v) an inline air filter to filter the inflow air;
      (vi) a plurality of temperature sensors whose probes can be inserted to food samples in food pans to measure food temperatures;
      vii) a humidity sensor being used to measure the humidity of the food chamber; and
      viii) a pressure sensor being used to measure the pressure of the food chamber;
   b) a utility module being connected to the food chamber, comprising:

(i) a vacuum pump arranged to pump air out of the food chamber to reach extremely low pressure conditions;
(ii) a cold trap arranged to condense water vapor from the food chamber back to liquid form;
(iii) a refrigeration unit being used to cool down the cold trap;
(iv) a vacuum control valve arranged to isolate the food chamber and cold trap, and to regulate the exhaust air flow;
(v) a vacuum air connection tubing that connects the food chamber and cold trap so the air can pass through;
(vi) an electrical panel arranged to receive electric power and supply the power to the apparatus; and
(vii) a conduit that hosts the electrical and signal wires in between the food chamber module and utility module;
c) a control and monitoring module, comprising:
(i) a computer and control device that enables chamber pressure control for the apparatus;
(ii) an HMI screen that allows the user to operate the apparatus; and
d) a 2-Input-1-Output (2×1) pressure control system to control the food chamber pressure, further comprising:
(i) a 1-input-2-output (1×2) pressure controller;
(ii) a 2-input-1-output (2×1) pressure system;
(iii) an actuator 1 being the vacuum control valve;
(iv) an actuator 2 being the inflow air control valve; and
(v) a pressure setpoint trajectory calculation mechanism; and
(iii) the control and monitoring module further comprising:
(a) a system power switch to turn on or off the apparatus; and
(b) a plurality of system status lights to indicate the working or abnormal status of the apparatus.

9. The apparatus of claim 8, in which the extremely low pressure conditions have chamber pressure near 0.1 ATM or 10 kPa.

10. The control system of claim 8, wherein the 1-input-2-output (1×2) pressure controller is a Model-Free Adaptive (MFA) controller, a Proportional-Integral-Derivative (PID) controller, a Proportional-Integral (PI) controller, or a Proportional controller (P), comprising a split-range setter to produce control output 1 and 2 to manipulate actuator 1 and 2.

11. The 1×2 pressure controller of claim 10, in which the split-range setter produces controller outputs of the form:

$$V_1(t) = -100\frac{u(t)}{R_1} + 100, \quad \text{for all } u(t) \in [0, R_1]$$

$$V_1(t) = 0, \quad \text{for all } u(t) \in (R_1, 100]$$

$$V_2(t) = -100\frac{u(t) - 100}{R_2 - 100} + 100, \quad \text{for all } u(t) \in [R_2, 100]$$

$$V_2(t) = 0, \quad \text{for all } u(t) \in [0, R_2)$$

or an equivalent thereof, in which $0 < R_1 \leq 100$, $0 \leq R_2 < 100$, the signals $u(t)$, $V_1(t)$, and $V_2(t)$ all having a working range of 0 to 100.

12. The 1×2 pressure controller of claim 10, in which the split-range setter is set with the values of R1 and R2 to enable three working conditions, in which:
(a) vacuum control valve is open and inflow air flow valve is closed, chamber pressure is decreasing;
(b) both vacuum control valve and inflow air control valve are closed, chamber pressure is holding steady; and
(c) vacuum control valve is closed and inflow air flow valve is open, chamber pressure is increasing.

13. The control system of claim 8, in which the pressure setpoint trajectory calculation mechanism is generated in the following form for cooling Type A Foods:
Ps(t)=Pi(0)−a*t; During initial ramp down period;
Ps(t)=C; During the first holding period;
or an equivalent thereof, in which Pi(0)>0 is the initial chamber pressure, and a>0, C>0 are pre-determined constants being used in cooling recipes.

14. The control system of claim 8, in which the pressure setpoint trajectory calculation mechanism is generated in the following form so the food chamber pressure is controlled to avoid liquid splash events for food flavor infusion and for cooling Type B Foods:
Ps(t)=Pi(0)−a*t; During initial ramp down period;
Ps(t)=C1; During the first holding period;
Ps(t)=C1+b*t; During the ramp up period;
Ps(t)=C2; During the second holding period;
Ps(t)=C2−d*t; During the second ramp down period;
Ps(t)=C3, During the endpoint period;
or an equivalent thereof, in which Pi(0)>0 is the initial chamber pressure, and a>0, b>0, d>0, C1>0, C2>0, C3>0 are pre-determined constants being used in cooling recipes.

15. The computer and control device of claim 8 being implemented with an industrial personal computer (IPC), or a programmable logic controller (PLC), or a programmable automation controller (PAC), or a specially designed control device, or a combination thereof.

* * * * *